United States Patent [19]

Hockney

[11] 4,337,387
[45] Jun. 29, 1982

[54] BACKING SUPPORT STRIP FOR WELDING
[75] Inventor: Philip K. Hockney, Smithfield, Australia
[73] Assignee: Hockney Engineering Pty. Ltd., New South Wales, Australia
[21] Appl. No.: 169,585
[22] Filed: Jul. 17, 1980
[51] Int. Cl.³ .......................... B23K 9/02; B23K 5/22
[52] U.S. Cl. ...................................... 219/160; 228/216
[58] Field of Search ................... 219/160; 228/50, 216
[56] References Cited

U.S. PATENT DOCUMENTS

| 2,737,710 | 3/1956 | Noble et al. | 228/216 X |
| 3,511,960 | 5/1970 | De Haeck | 228/216 X |
| 4,182,951 | 1/1980 | Kuder | 219/160 |
| 4,201,326 | 5/1980 | Connell | 219/160 X |

FOREIGN PATENT DOCUMENTS

| 1115858 | 10/1961 | Fed. Rep. of Germany | 219/160 |
| 48-12616 | 4/1973 | Japan | 219/160 |
| 1188803 | 4/1970 | United Kingdom | 219/160 |

Primary Examiner—J. V. Truhe
Assistant Examiner—Keith E. George
Attorney, Agent, or Firm—Ladas & Parry

[57] ABSTRACT

A section to aid in the welding of metal sheet, the section having a body portion forming part of the sheets, a projection extending from the body portion, which projection receives a strip of weld resistant material, which strip is to be located adjacent abutting edges of the strip.

4 Claims, 2 Drawing Figures

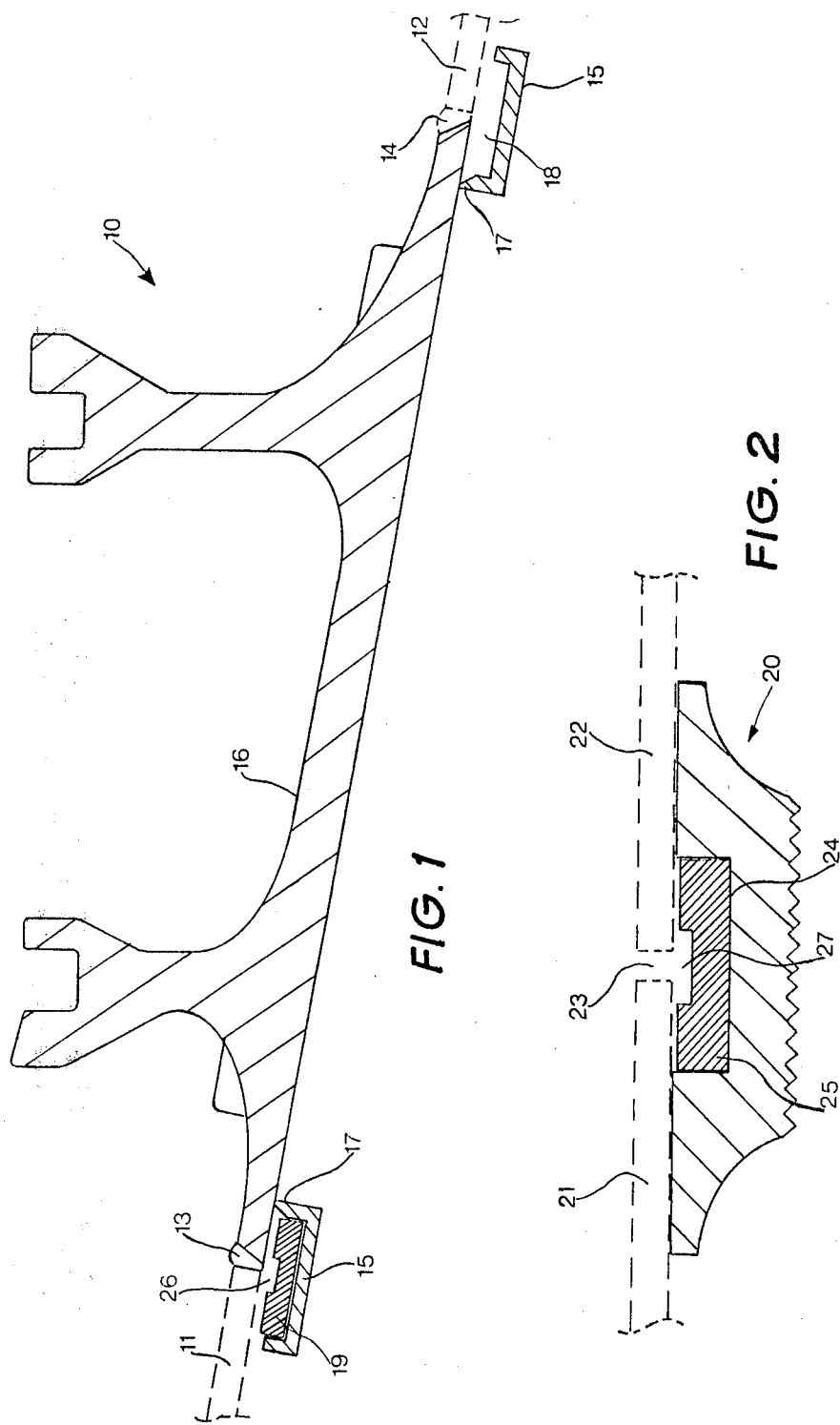

BACKING SUPPORT STRIP FOR WELDING

The present invention relates to welding methods and more particularly but not exclusively to methods of welding metal sheet to be used in the manufacture of storage tanks.

In the manufacture of tanks as used for the road transportation of bulk liquid, the tank is manufactured from a single sheet of metal, usually aluminum alloy. The sheet is formed around shaped ends until its longitudinal ends meet. These longitudinal edges are welded together and the shaped ends welded to the sheet to form the tank. Subsequently fittings such as support rails are welded to the formed tank. This method of construction is generally time consuming and expensive, while also not making the most efficient use of materials.

It is the object of the present invention to overcome or substantially ameliorate the above disadvantages.

There is disclosed herein a section to aid in the welding of metal sheet comprising, a body portion having a longitudinal edge for attachment to a longitudinal edge of a sheet, a backing support portion formed integral with the body portion so as to be joined thereto by a longitudinal rupturable web, said support portion having a longitudinal recess to receive a backing strip for the weld to be formed on the longitudinal edge of the body portion to join it to the longitudinal edge of the sheet, said recess being substantially co-extensive with the longitudinal edge of the body portion and extending laterally on both sides thereof.

There is also disclosed herein a backing support strip to be removably attached to abutting edges of a metal sheet or sheets, said support strip having a longitudinal recess to extend adjacently along and laterally of said edges.

A preferred form of the present invention will now be disclosed by way of example with reference to the accompanying drawings;

FIG. 1 is a section of a longitudinal extruded member to be provided as a joining member between two sheets of aluminium alloy; and FIG. 2 is a section of a longitudinal strip to be used as a backing member when joining two sheets of aluminium alloy.

With reference to FIG. 1, the section 10 of extruded aluminium alloy is provided between two sheets 11 and 12 of aluminium alloy. The sheets 11 and 12 are to be structurally joined by each being welded, by means of welds 13 and 14, to the section 10. The section 10 includes backing supports 15 attached to the main body portion 16 of the section 10 by a fracturable web 17 of reduced cross section. Each of the backing supports 15 defines a recess 18 to receive a backing strip 19 preferably of brass or copper so that the welds 13 and 14 do not adhere to the strip 19. The web 17 is provided so that the backing support 15 and backing strip 19 are easily removed by fracture of the web 17. The strip is provided with a recess 26 to allow correct formation of the weld 13.

With reference to FIG. 2 there is provided a backing support strip 20 to be used in the joining of sheets 21 and 22 by the application of a weld to the opening 23. The strip 20 has a recess 24 to receive backing strip 25 which is preferably of a different material to that of the sheets 21 and 22 so that the strip 25 does not adhere to the sheets 21 and 22. The strip 25 is provided with a recess 27 to allow the correct formation of the weld.

Using the above discussed method and sections in the manufacture of storage tanks the section 10 provides a mounting for the tank on a vehicle to receive the tank. Additional sections may be welded to the sheet to provide rails and other fixtures. The strip 20 facilitates the manufacture of any cylindrical storage tank which is formed from a series of cylindrical sections joined at their abutting ends by a weld formed with the use of backing strip 25. As an example of the use of the strip 20, it could be secured within the interior of a cylindrical tank to be manufactured from two or more cylindrical sections. Two sections 21 and 22 could be placed in an end abutting relationship and strip 20 located on the interior and extending around the join. The strip is then pressed radially outwardly to maintain the section in axial alignment.

What I claim is:

1. An extruded metal strip having longitudinal sides adapted to be welded to an adjacent strip of metal abutting one of said sides, said strip having a main body portion with said one side, a backing support portion formed integral with the body portion so as to be joined thereto by a longitudinal rupturable web, said web having a variable thickness so as to have a longitudinally extending groove along which the web ruptures, said support portion having a longitudinal recess to receive a backing strip for the weld to be formed on said one side, said recess being substantially co-extensive with said one side and extending laterally on both sides thereof so that a backing strip located therein will prevent said support portion being welded to said main body portion thus enabling removal of the support portion and backing strip upon completion of the weld by the rupture of said web along said groove.

2. The strip of claim 1 wherein said body portion has a generally planar part having the longitudinal side, and further has projections extending outwardly from said planar part enabling the section to be mounted or attached to another object.

3. The strip of claim 1 or 2 wherein said body portion has a second longitudinal side parallel to said one side of the body portion, and further has a second backing support portion located adjacent said second side, and wherein said second side is adapted to be joined to a further adjacent metal strip.

4. The strip of claim 3 wherein the second backing support is jointed to the body portion by the rupturable web formed integral with the body and second backing support.

* * * * *